(12) United States Patent
Huynh

(10) Patent No.: US 6,583,633 B2
(45) Date of Patent: Jun. 24, 2003

(54) MEASURING DEVICE, ESPECIALLY FOR A HEATING/AIR-CONDITIONING INSTALLATION

(75) Inventor: Tan Duc Huynh, Neuilly S/Marne (FR)

(73) Assignee: Valeo Climatisation, La Verriere (FR)

( * ) Notice: Subject to any disclaimer, the term of this patent is extended or adjusted under 35 U.S.C. 154(b) by 4 days.

(21) Appl. No.: 09/917,174

(22) Filed: Jul. 30, 2001

(65) Prior Publication Data

US 2002/0036197 A1 Mar. 28, 2002

(30) Foreign Application Priority Data

Jul. 28, 2000 (FR) ............................................ 00 09925

(51) Int. Cl.[7] ........................ G01R 27/08; G01R 31/02; G01R 31/327

(52) U.S. Cl. ........................................ 324/713; 324/417

(58) Field of Search ................................. 324/417, 713, 324/605, 609

(56) References Cited

U.S. PATENT DOCUMENTS

| 4,102,199 A | | 7/1978 | Tsipouras |
| 5,399,981 A | * | 3/1995 | Vermesse ..................... 324/714 |
| 5,775,809 A | | 7/1998 | Cooley et al. |
| 5,902,044 A | | 5/1999 | Pricer et al. |

FOREIGN PATENT DOCUMENTS

WO   WO 99/05480   4/1999

OTHER PUBLICATIONS

"Two Temperature Sensors Share a Twisted Pair", by Hendricks, EDN Electrical Design News, vol. 38, No. 22, Oct. 28, 1993, p. 100.

* cited by examiner

Primary Examiner—Christine Oda
Assistant Examiner—John Teresinski
(74) Attorney, Agent, or Firm—Liniak, Berenato and White

(57) ABSTRACT

A temperature-measuring device for a heating/air-conditioning installation, having sensors biased by at least one electrical power-supply source including at least one series branch exhibiting a first and a second terminal coupled to terminals of a power-supply source, the first branch featuring a first (D1) and a second (D2) diode head to tail, connected between the first (2) and the second (3) terminal of the series branch, and also a first (CT1) and a second (CT2) detector connected in series between the first (2) and the second (3) terminal of the series branch, the common point between the first (D1) and the second (D2) diode being connected to the common point between the first (CT1) and the second (CT2) detector, and where a changeover-switching device is included for reversing the direction of the bias so that the first (CT1) or the second (CT2) sensor is traversed by a current.

10 Claims, 2 Drawing Sheets

MEASURING DEVICE, ESPECIALLY FOR A HEATING/AIR-CONDITIONING INSTALLATION

FIELD OF THE INVENTION

The present invention relates to a measuring device which features sensors exhibiting a variation in impedance or in voltage, especially temperature sensors, which is suitable more particularly for a heating/air-conditioning installation.

BACKGROUND OF THE INVENTION

In heating/air-conditioning installations, the temperature sensors for the air conditioning are generally passive components of thermistor type, and more particularly negative-temperature-coefficient thermistor (NTC) type.

They are generally biased by a calibration voltage source, for example at 5V, via a resistor, especially a precision resistor of 1% class.

The voltage measured at the terminals of the thermistor is next amplified and measured by a microprocessor-type thermal-regulation device.

Such a conventional device dictates, for each sensor, that two connecting wires be linked to the regulation card which the microprocessor includes.

In an air-conditioning system including 6 temperature sensors, 12 direct or indirect connections with the regulation card have to be made available, resulting in a high cost of the wiring harness and of the associated connections, and problems of reliability which result from the relative complexity of the assembly.

SUMMARY OF THE INVENTION

One object of the invention is to propose reducing the number of connection points of the sensors by at least two.

Another object of the invention is to reduce the number of analogue-measuring inputs of the regulation card.

Another object of the invention is to propose a device which is simpler and therefore of higher reliability.

At least one of the abovementioned objects is achieved by virtue of a measuring device intended especially for a heating/air-conditioning installation, and comprising sensors biased by at least one electrical power-supply source, characterised in that it includes at least one series branch featuring a first and a second terminal coupled to terminals of a said power-supply source, the said first branch featuring, on the one hand, a first and a second diode head to tail connected between the first and the second terminal of the series branch, and, on the other hand, a first and a second sensor connected in series between the first and the second terminal of the series branch, the common point between the first and the second diode being connected to the common point between the first and the second sensors, and in that it includes a changeover-switching device for reversing the direction of the said bias so that the first or the second sensor is traversed by a current.

The sensors may be of a type exhibiting a variation in impedance, temperature sensors in particular.

The device may be characterised in that at least one terminal of a said power-supply source is connected, on the one hand, to a bias resistor in series with a first voltage source having a first potential and, on the other hand, to a changeover-switching element, especially a transistor, exhibiting a first, non-conducting state and a second, conducting state, in order to take the said terminal to a second potential, the said bias resistor in series with the first voltage source and the changeover-switching element constituting a bistable device.

According to one advantageous embodiment, the device is characterised in that the first and the second terminal of the said series branch are each coupled to a said bistable device, and in that the said changeover-switching device is configured to place the changeover-switching element of one of the bistable devices in the first, conducting state and the changeover-switching element of the other bistable device in the second, non-conducting state alternately.

The device advantageously features n series branches BS1 . . . BSn connected in series and coupled to n−1 power-supply terminals BA1 . . . BAn−1.

According to one preferred embodiment, the device features at least one series branch coupled to a power-supply terminal of rank P, BSp, and to a power-supply terminal of rank (p+q), BSp+q, with q>1.

The device may be characterised in that it features a microprocessor for switching over at least one changeover-switching device and for measuring at least one voltage developed by a sensor, especially a temperature sensor. The said changeover switching is preferably sequential in such a way as to allow reading of each of the sensors.

Finally, the invention relates to a heating and/or air-conditioning installation as defined above.

BRIEF DESCRIPTION OF THE DRAWINGS

Other characteristics and advantages of the invention will emerge better on reading the description below, in connection with the attached drawings, in which:

FIG. 2a represents an embodiment of the invention, of which

DESCRIPTION OF THE PREFERRED EMBODIMENTS

Figure 1:
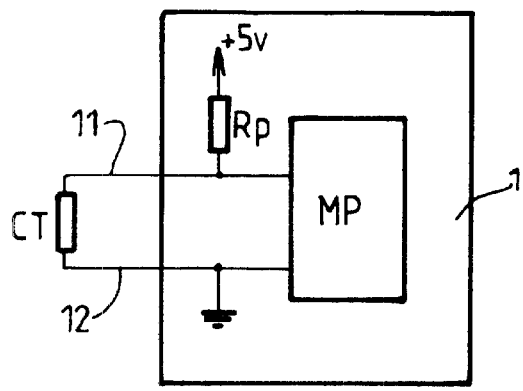
FIG. 1 illustrates a device of the prior art.

A device of the prior art is represented in FIG. 1. A temperature sensor CT, for example a negative-temperature-coefficient thermistor, is connected by wires 11 and 12 to inputs of a regulation card 1, consisting, for example, of a printed circuit carrying a microprocessor MP and a bias resistor Rp connected to a 5V voltage source at the wire 11, the wire 12 being earthed. In this type of layout, two wires are necessary for connection to the regulation card 1 for each sensor CT.

Figure 2A:
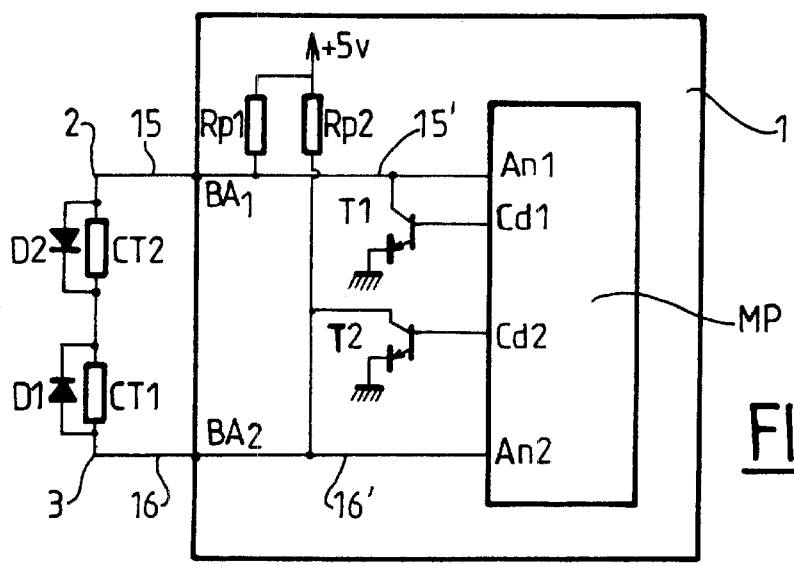
Figure 2B:
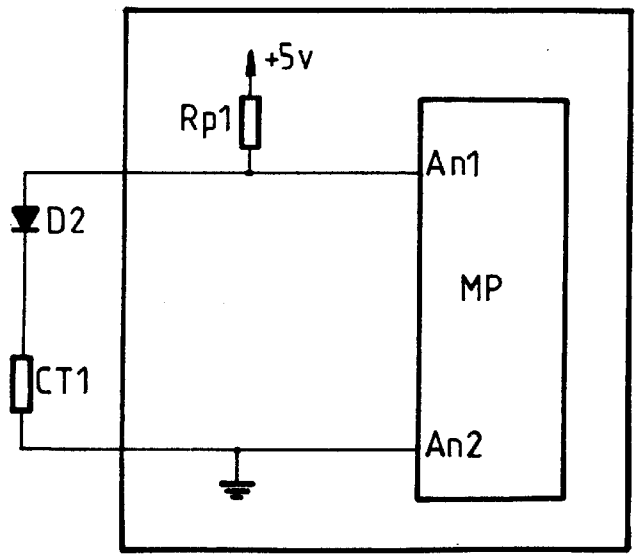
FIG. 2b constitutes an equivalent diagram in one of the states of the transistors T1 and T2.
Figure 3:
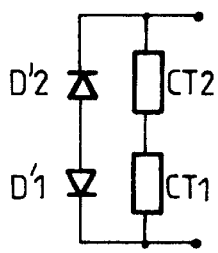
FIG. 3 represents a variant series branch.

In FIG. 2a, two thermistors CT1 and CT2 are placed in series between terminals 2 and 3. Diodes D1 and D2 are connected to the terminals of the thermistors CT1 and CT2, but with inverse connection directions, so that the diodes D1 and D2 are mounted head to tail, having their cathode in common as represented (or their anode in common as represented in FIG. 3 with the diodes D'1 and D'2).

The wires 15 and 16 are connected to terminals BA1 and BA2 of the card 1. The sensors are biased by two bias resistors Rp1 and Rp2 connected to a voltage source V and respectively to the wires 15 and 16.

The wire 15 is connected to one terminal of the sensor CT2 and to an analogue input An1 of the microprocessor MP.

The wire 16 is connected to one terminal of the sensor CT1 and to an analogue input An2 of the microprocessor MP.

The microprocessor MP alternately drives the transistors T1 and T2.

The transistor T1 has its base connected to a control input Cd1 of MP, its emitter connected to earth, and its collector connected to the metallisation 15' which goes from the terminal BA1 to the input An1.

Likewise, the transistor T2 has its base connected to the control input Cd2, its emitter connected to earth, and its collector connected to the metallisation 16' which goes from the terminal BA2 to the input An2.

When T1 is closed and when T2 is in the conducting state, the terminal BA2 is taken to earth potential (or to another chosen potential different from V) and the terminal BA1 is fed via the resistor Rp1, as FIG. 3 shows.

In this state, D2 is forward-biased and short-circuits the sensor CT2, whereas D1 is reverse-biased, which makes it possible to select the sensor CT1 with a view to a measurement.

In the other state (T1 conducting, T2 closed), the terminal BA1 is taken to earth potential (or to another potential different from V) and the diode D1 is forward-biased so as to short-circuit CT1, whereas the diode D2 is reverse-biased, which makes it possible to select the sensor CT2 with a view to a measurement.

By sequentially switching over the transistors between the two above-mentioned states, alternate reading of the sensors CT1 and CT2 is obtained by time-division multiplexing.

Figure 4:
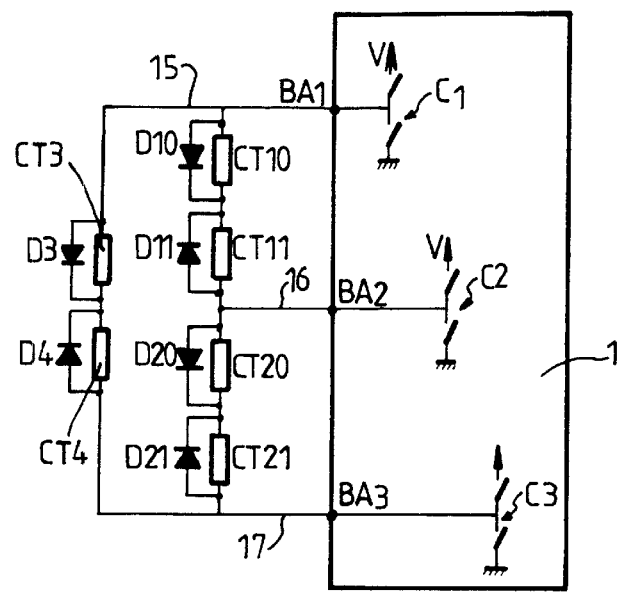
FIGS. 4 and 5 represent preferred variants of the invention.

FIG. 4 illustrates a re-grouping of series branches each including two sensors CT in series, with two head-to-tail diodes in parallel. The series branch (CT10, CT11, D10, D11) is arranged in series with the series branch (CT20, CT21, D20, D21), the ends of these branches being connected to terminals BA1, BA2 and BA3 of the card 1. This layout requires only three wires 15, 16, 17 for four sensors.

It is also possible to add to this assembly a series branch (CT3, CT4, D3, D4) between the terminals BA1 and BA3, which makes it possible to control 6 sensors from 3 terminals BA1, BA2 and BA3 of the regulation card 1.

Each of the changeover switches C1, C2, C3 can take the terminals BA1, BA2, BA3, to a potential V (for example 5V) or to an earth potential.

Depending on the various voltages on the terminals BA1, BA2, BA3, the situation is:

| BA1 | BA2 | BA3 | SENSORS ACTIVE |
|---|---|---|---|
| V | O | O | CT4, CT11 |
| V | V | O | CT4, CT21 |
| O | V | O | CT10, CT21 |
| O | O | V | CT3, CT20 |
| V | O | V | CT11, CT20 |
| O | V | V | CT3, CT10 |

Thus operation in pairs of active sensors is obtained.

Figure 5:
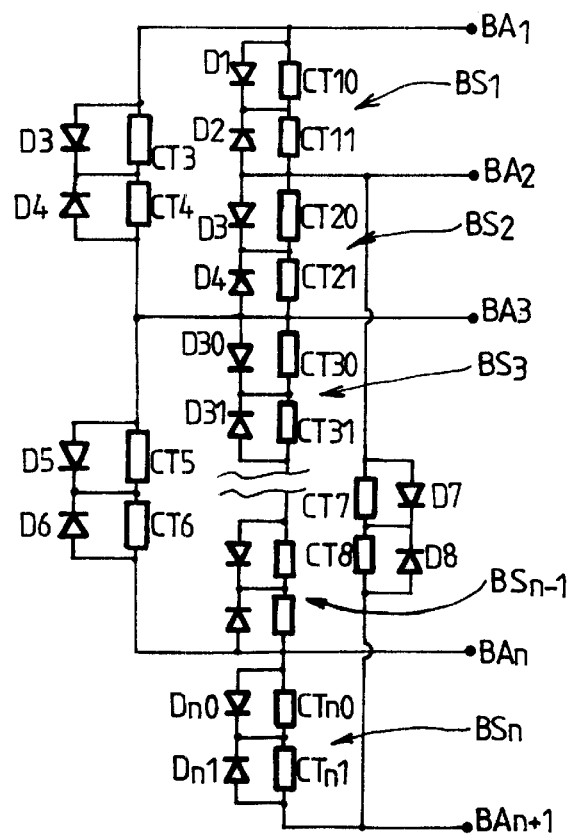

On the basis of the first four states, for example, it is possible to scan all the sensors. It is sufficient, consequently, to switch over the changeover switches C1, C2 and C3 sequentially in order, by time-division multiplexing, to obtain read-mode scanning of each of the sensors. FIG. 5 shows an embodiment according to which n series branches BS1, BS2 ... BSn are connected to the terminals BA1, BA2, BAp, BAn+1.

Moreover, other series branches, for example (D3, D4, CT3, CT4) connected between BA1 and BA3, (D5, D6, CT5, CT6) connected between BA3 and BAn, or else (D7, D8, CT7, CT8) connected between BA2 and BAn+1, can be added, in particular to provide supplementary options for detection without increasing the number of wires, nor the connections from the card 1.

These added series branches, in particular, are connected between two non-contiguous terminals BAp, and BAp+q, that is to say q>1, in such a way as to create current paths different from those which existed because of the presence of the n series branches in series. In the same way as in the case of FIG. 4, time-division multiplexing can make it possible to read each of the sensors sequentially.

The invention is capable of being applied to the measurement or sensing of dipoles exhibiting a variation in impedance (thermistor, strain gauge, etc.) or in voltage (solar sensor, etc.).

What is claimed is:

1. A Measuring device for a heating/air-conditioning installation, comprising sensors biased by at least one electrical power-supply source, wherein said measuring device further comprises at least one series branch (D1, D2, CT1, CT2) featuring a first and a second terminal coupled to terminals of said power-supply source, said series branch comprising a first (D1) and a second (D2) diode head to tail connected between the first (2) and the second (3) terminal of the series branch (D1, D2, CT1, CT2), and a first (CT1) and a second (CT2) sensor connected in series between the first (2) and the second (3) terminal of the series branch, wherein the common point between the first (D1) and the second (D2) diode is connected to the common point between the first (CT1) and the second (CT2) sensors, and a changeover-switching device for reversing the direction of the said bias so that the first (CT1) or the second (CT2) sensor is traversed by a current.

2. The measuring device according to claim 1, wherein at least one terminal (BA1) of said power-supply source is connected to a bias resistor (Rp1) in series with a first voltage source having a first potential (V) and to a changeover-switching element, wherein said changeover-switching element is a transistor (T1, T2), exhibiting a first, non-conducting state and a second, conducting state, in order to take said at least one terminal to a second potential (OV), and said bias resistor (Rp1) is in series with the first voltage source and the changeover-switching element (T1, T2) constituting a bistable device.

3. The measuring device according to claim 2, wherein the first (2) and the second (3) terminal of said series branch are each coupled to said bistable device (T1, T2), and said changeover-switching device is configured to place the changeover-switching element (T1) of one of the bistable devices in the first, conducting state and the changeover-switching element (T2) of the other bistable device in the second, non-conducting state alternately.

4. The measuring device according to claim 1, wherein n series of branches BS1, BS2, ... BSn are connected in series and coupled to n-1 power-supply terminals BA1, BA2, ... BAn-1.

5. The measuring device according to claim 4, wherein at least one series branch is coupled to a power-supply terminal of rank p, BSp, and to a power-supply terminal of rank p+q, BSp+q, where q>1.

6. The measuring device according to claim 1, further comprising a microprocessor (MP) for switching over at least one changeover-switching device and for measuring at least one voltage developed by at least one sensor (CT1, CT2, etc.).

7. The measuring device according to claim 1, wherein said changeover switching is sequential to allow reading of each of the sensors (CT1, CT2, etc.).

8. The measuring device according to claim 1, wherein the sensors exhibit a variation in impedance.

9. The measuring device according to claim 8, wherein the sensors are temperature sensors (CT1, CT2, etc.).

10. At least one heating and air-conditioning installation comprising a device according to claim 1.

* * * * *